United States Patent
Sugisaki et al.

(10) Patent No.: US 9,864,693 B2
(45) Date of Patent: Jan. 9, 2018

(54) DATA PROCESSING METHOD, INFORMATION PROCESSING DEVICE, AND RECORDING MEDIUM

(71) Applicant: FUJITSU LIMITED, Kawasaki-shi, Kanagawa (JP)

(72) Inventors: Yoshinori Sugisaki, Mishima (JP); Kiyofumi Suzuki, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/922,717

(22) Filed: Oct. 26, 2015

(65) Prior Publication Data

US 2016/0170894 A1  Jun. 16, 2016

(30) Foreign Application Priority Data

Dec. 16, 2014  (JP) .................................. 2014-254588

(51) Int. Cl.
*G06F 12/08* (2016.01)
*G06F 3/06* (2006.01)
(Continued)

(52) U.S. Cl.
CPC ........ *G06F 12/0893* (2013.01); *G06F 3/0617* (2013.01); *G06F 3/0629* (2013.01); (Continued)

(58) Field of Classification Search
CPC ......... G06F 2212/1032; G06F 12/0871; G06F 3/0629; G06F 12/0893; G06F 3/0617; (Continued)

(56) References Cited

U.S. PATENT DOCUMENTS 5,630,097 A * 5/1997 Orbits ..................... G06F 12/10
710/33
5,943,691 A * 8/1999 Wallace ................ G06F 8/4442
711/118

(Continued)

FOREIGN PATENT DOCUMENTS

JP      10-207772       8/1998
JP      2000-35894      2/2000
(Continued)

OTHER PUBLICATIONS

Truong, Bodin, Seznec, Improving Cache Behavior of Dynamically Allocated Data Structures, 1998.*

(Continued)

*Primary Examiner* — Mano Padmanabhan
*Assistant Examiner* — Andrew J Cheong
(74) *Attorney, Agent, or Firm* — Staas & Halsey LLP

(57) ABSTRACT

A data processing method executed by a processor included in an information processing device, the data processing method includes reserving a storage area of a memory when a reservation request is detected; acquiring a number of cache misses indicating that desired data is not capable of being read from a storage area to be accessed, the cache misses having occurred in response to a request for access to the storage area; and setting a new storage area so as to shift the new storage area from the reserved storage area when it is determined that the acquired number is larger than or equal to a given value.

19 Claims, 13 Drawing Sheets

(51) Int. Cl.
*G06F 12/02* (2006.01)
*G06F 12/0893* (2016.01)
*G06F 12/0842* (2016.01)
*G06F 12/0888* (2016.01)
*G06F 12/0862* (2016.01)

(52) U.S. Cl.
CPC ........ *G06F 3/0673* (2013.01); *G06F 12/0223* (2013.01); *G06F 12/0842* (2013.01); *G06F 12/0888* (2013.01); *G06F 12/0862* (2013.01); *G06F 2212/1021* (2013.01); *G06F 2212/1032* (2013.01)

(58) Field of Classification Search
CPC ............... G06F 3/0673; G06F 12/0223; G06F 2212/1021; G06F 2212/604; G06F 2212/6046
See application file for complete search history.

(56) References Cited

U.S. PATENT DOCUMENTS

| | | | | |
|---|---|---|---|---|
| 6,041,393 A * | 3/2000 | Hsu | ........................ | G06F 8/4442 365/230.03 |
| 6,134,710 A * | 10/2000 | Levine | ................... | G06F 8/4442 707/999.202 |
| 6,775,740 B1 * | 8/2004 | Nishiyama | .......... | G06F 9/30043 711/118 |
| 9,438,424 B2 * | 9/2016 | Goss | ..................... | H04L 9/3236 |
| 2003/0097538 A1 * | 5/2003 | Hall | ....................... | G06F 8/4442 711/201 |
| 2003/0225996 A1 * | 12/2003 | Thompson | ............ | G06F 8/4442 712/207 |
| 2005/0091466 A1 * | 4/2005 | Larson | ................ | G06F 12/0802 711/170 |
| 2011/0055306 A1 * | 3/2011 | Dean | ..................... | G06F 17/141 708/401 |
| 2012/0254551 A1 * | 10/2012 | Kasahara | ................... | G06F 8/70 711/143 |
| 2014/0351529 A1 * | 11/2014 | Wells | ...................... | G06F 3/064 711/157 |
| 2016/0055094 A1 * | 2/2016 | Patsilaras | ............ | G06F 12/0893 711/118 |

FOREIGN PATENT DOCUMENTS

| | | |
|---|---|---|
| JP | 2004-252728 | 9/2004 |
| JP | 2011-128803 | 6/2011 |

OTHER PUBLICATIONS

Extended European Search Report dated Jun. 2, 2016 in corresponding European Patent Application No. 15192830.6.

Dan N. Truong et al., "Improving cache behavior of dynamically allocated date structures", IRISA-INRIA, Campus de Beaulieu, 35042 Rennes, Cedex, France, 1998 IEEE, pp. 322-329, XP010312271.

* cited by examiner

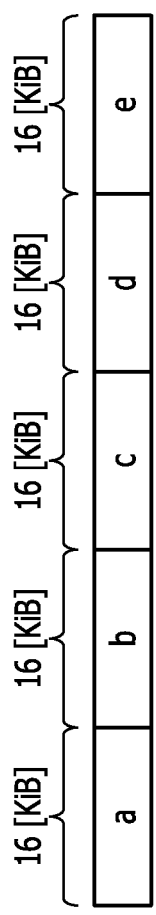
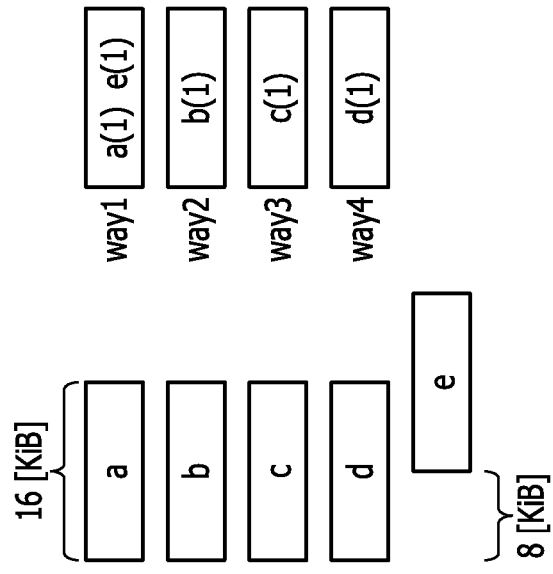
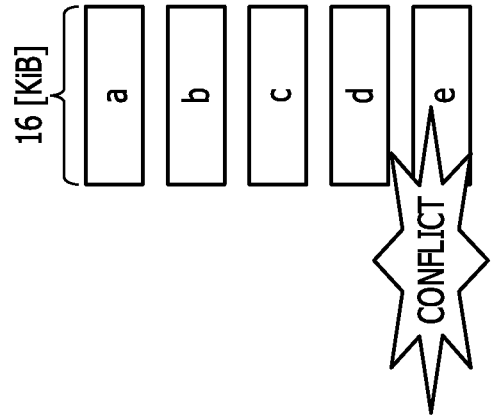

FIG. 9

| TARGET CACHE | | | L1 CACHE MEMORY | | | 310 |
|---|---|---|---|---|---|---|
| NAME | ARRAY DECLARATION NAME | ABC | ↓ | ↓ | ↓ | |
| DECLARATION SIZE | DATA SIZE | 8 [Byte] | ↓ | ↓ | ↓ | |
| | DIMENSION NUMBER | 3 | ↓ | ↓ | ↓ | |
| | PER-DIMENSION DECLARATION SIZE | 256,128,64 | ↓ | ↓ | ↓ | |
| ADDRESS INFORMATION | STARTING ADDRESS OF ARRAY | 1000000000 | 1000008192 | ↓ | ↓ | 1000004096 |
| INDEX INFORMATION | | 256,128,64 | ↓ | ↓ | ↓ | ↓ |
| OCCURRENCE COUNT | PADDING COUNT | 0 | 1 | ↓ | ↓ | 2 |
| | NUMBER OF TIMES CACHE MISS RATIO THRESHOLD IS EXCEEDED | 0 | 1 | ↓ | ↓ | 2 |
| PADDING AND CACHE MISS INFORMATION | PADDING SIZE (1) | - | 8192 (8 KiB) | ↓ | ↓ | ↓ |
| | CACHE MISS INFORMATION (1) — LOAD STORE INSTRUCTION NUMBER | 10000 | ↓ | ↓ | ↓ | ↓ |
| | L1D MISS NUMBER | 500 | ↓ | ↓ | ↓ | ↓ |
| | L1D DEMAND MISS NUMBER | 200 | ↓ | ↓ | ↓ | ↓ |
| | L1D MISS RATIO | - | 5.00[%] | ↓ | ↓ | ↓ |
| | L1D DEMAND MISS RATIO | - | 40[%] | ↓ | ↓ | ↓ |
| | PADDING SIZE (2) | - | - | 4096 (4 KiB) | ↓ | ↓ |
| | CACHE MISS INFORMATION (2) — LOAD STORE INSTRUCTION NUMBER | - | - | 10000 | ↓ | ↓ |
| | L1D MISS NUMBER | - | - | 400 | ↓ | ↓ |
| | L1D DEMAND MISS NUMBER | - | - | 120 | ↓ | ↓ |
| | L1D MISS RATIO | - | - | - | 4.00[%] | ↓ |
| | L1D DEMAND MISS RATIO | - | - | - | 30[%] | ↓ |
| | | 1A | 1B | 2A | 2B | |

DATA PROCESSING METHOD, INFORMATION PROCESSING DEVICE, AND RECORDING MEDIUM

CROSS-REFERENCE TO RELATED APPLICATION

This application is based upon and claims the benefit of priority of the prior Japanese Patent Application No. 2014-254588, filed on Dec. 16, 2014, the entire contents of which are incorporated herein by reference.

FIELD

The embodiment discussed herein is related to a data processing method, an information processing device, and a recording medium.

BACKGROUND

There is a phenomenon called cache thrashing, where data in a certain cache line within cache memory is frequently overwritten. As a related art technique, for example, a technique that profiles an application by using a performance monitor in order to collect cache miss data, and inserts preload instructions prior to effective address positions of offending instructions that create long cache misses is disclosed. A technique in which it is determined whether or not the deterioration of the performance ascribable to the deterioration of the cache use efficiency is small even when the array is subjected to the padding is disclosed. A technique of adding run-time prediction code for cache misses within a loop is disclosed. The code predicts at run time, on a per loop basis on which prefetch is performed, whether or not the cache miss ratio of a loop will be greater than or equal to a certain threshold. A technique is disclosed in which, after aligned loop decomposition is performed, scheduling for executing small loops included in the same data localizable group (DLG) continuously as long as possible is performed, and the layout change using padding is made for array data used in each DLG. As examples of the related art, Japanese Laid-open Patent Publication No. 2000-035894, Japanese Laid-open Patent Publication No. 2011-128803, Japanese Laid-open Patent Publication No. 10-207772, and Japanese Laid-open Patent Publication No. 2004-252728 are disclosed.

However, according to the related art techniques, it is difficult to inhibit cache thrashing from occurring while a program is running. For example, even when, as a result of analysis performed by using a performance monitor, it is detected that cache thrashing would occur, and padding is added, analysis and program execution will be repeated a plurality of times in order to check whether or not cache thrashing is in reality inhibited from occurring. In view of the above, it is desirable that cache thrashing be inhibited from occurring while a program is running.

SUMMARY

According to an aspect of the invention, a data processing method executed by a processor included in an information processing device, the data processing method includes reserving a storage area of a memory when a reservation request is detected; acquiring a number of cache misses indicating that desired data is not capable of being read from a storage area to be accessed, the cache misses having occurred in response to a request for access to the storage area; and setting a new storage area so as to shift the new storage area from the reserved storage area when it is determined that the acquired number is larger than or equal to a given value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A, FIG. 7B, and FIG. 7C are explanatory diagrams illustrating an example of computing a padding size;

FIG. 9 is an explanatory diagram (2) illustrating an example of storage content of the thrashing information table;

DESCRIPTION OF EMBODIMENT

Hereinafter, an embodiment of an information processing device, a data processing method, and a data processing program of the present disclosure will be described in detail with reference to the accompanying drawings.

Figure 1:
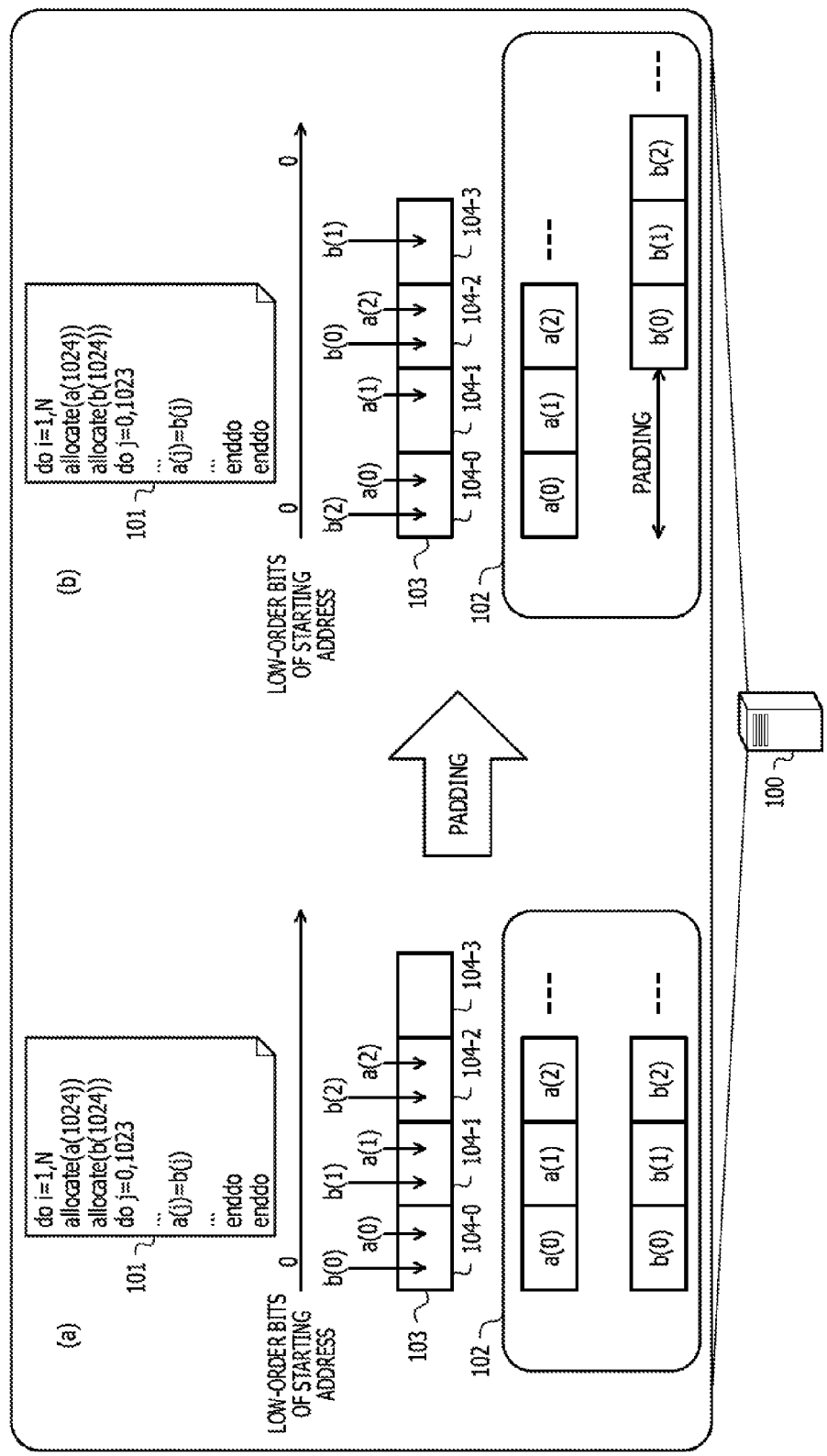
FIG. 1 is an explanatory diagram illustrating an example of operation of an information processing device according to the present embodiment.

FIG. 1 is an explanatory diagram illustrating an example of operation of an information processing device 100 according to the present embodiment. The information processing device 100 is a computer that executes execution code 101. The information processing device 100 may be, for example, a server or a portable terminal such as a mobile phone. More specifically, the information processing device 100 includes a storage unit 102 and a level 1 (L1) cache memory 103. The L1 cache memory 103 stores part of data of the storage unit 102. The central processing unit (CPU) of the information processing device 100 accesses the L1 cache memory 103 and the storage unit 102 and executes the execution code 101.

The L1 cache memory 103 searches whether or not, at the time of prefetch that occurs prior to an access request, or at the time of an access request, a storage area to be accessed is allocated to a cache line. If the storage area is not allocated, the L1 cache memory 103 determines a cache miss and allocates the storage area to be accessed to a cache line. Hereinafter, a cache miss, when simply described, includes a cache miss at the time of prefetch and a cache miss due to an access request. The cache miss due to an access request is referred to as a "demand miss".

Here, a phenomenon called cache thrashing, where data in a certain cache line within cache memory is frequently overwritten, sometimes occurs. Once cache thrashing occurs, the exchange of cache lines frequently occurs, leading to degradation in the performance of the cache memory. It is known that cache thrashing easily occurs when the array size is a power of two, or when the number of pieces of a series of data for which, as processing within a loop is performed, references are defined is large.

One of the techniques for inhibiting cache thrashing from occurring is that the occurrence of cache thrashing is detected by analysis using a tool, data causing the occurrence of cache thrashing is identified, and the developer manually pads the data. However, in order to identify data causing the occurrence of cache thrashing, analysis and program execution are performed a plurality of times. In addition, regarding the padding size, in order to find the best value at which cache thrashing is able to be inhibited from occurring, analysis using a tool and program execution are performed a plurality of times.

Therefore, in the information processing device 100, when it is determined that the number of cache misses in a reserved storage area is larger than or equal to a given value, that is, when it is determined that cache thrashing has occurred, a new storage area is set so as to be shifted from the reserved storage area. Thus, a new storage area is allocated to a cache line different from a cache line where a conflict has occurred, and therefore the information processing device 100 may inhibit cache thrashing from occurring. The given value may be a value predetermined by the developer. Alternatively, the given value may be a value obtained by multiplying the total value of load instructions and store instructions obtained when the processor operated last time, by a ratio predetermined by the developer.

When the cache miss ratio of a reserved storage area is greater than or equal to a given ratio, the information processing device 100 may set a new storage area so as to shift it from the reserved storage area. Here, the cache miss ratio is the number of cache misses relative to the total value of load instructions and store instructions.

As a way to set a new storage area so as to shift it from the reserved storage area, for example, the information processing device 100 may reserve a new storage area after reserving a dummy storage area as padding. Alternatively, if it is possible to specify the addresses of storage areas to be reserved, the information processing device 100 may reserve a storage area using, as the starting address, a value obtained by adding a predetermined value to the starting address of a storage area originally scheduled to be reserved. Alternatively, for example, if an area preceding the storage area originally scheduled to be reserved is released, the information processing device 100 may reserve the storage area using, as the starting address, a value obtained by subtracting a predetermined value from the starting address of the storage area originally scheduled to be reserved. Description will be given below using an example where padding is performed.

In the example in FIG. 1, for the sake of easy explanation, the number of cache lines included in the L1 cache memory 103 is four. The individual cache lines are denoted as cache lines 104-0 to 3. The number of cache lines associated with any storage area of a storage unit 102 is assumed to be one. Here, in the following description, the number of cache lines associated with any storage area in the storage unit 102 is referred to as the number of ways. What is obtained by dividing a cache memory by the number of ways is referred to as one way. Specifically, which cache line any storage area of the storage unit 102 is associated with is determined in accordance with the low-order bits of the address. In the example in FIG. 1, the individual storage areas of the storage unit 102 are associated, in order from the smallest value of low-order bits of the address, with the cache lines in the order of the cache lines 104-0, 1, 2, and 3. For example, if the low-order bits of the starting address of a certain storage area is zero, the certain storage area is associated with the cache line 104-0.

Execution code 101, after dynamically reserving the storage areas of arrays a and b each having 1024 elements in accordance with a reservation request, performs some processing and repeats N times processing of setting each element of the array a to the value of each element of the array b. For the sake of easy explanation, the data size of each element of the arrays a and b is assumed to be the same as the size of one cache line. The information processing device 100, upon detecting a reservation request, reserves a storage area by using a particular routine for fulfilling the reservation request.

In (a) of FIG. 1, the state in which the storage areas of the arrays a and b are dynamically reserved for the first time is illustrated. In (a) of FIG. 1, padding is not performed. Consequently, the storage areas reserved for storing data of a (0) and b (0) correspond to the cache line 104-0. Hereinafter, a storage area reserved for storing data of an array (x) is referred to simply as a storage area of the array (x). Likewise, the storage areas of a (1) and b (1) correspond to the cache line 104-1, and the storage areas of a (2) and b (2) correspond to the cache line 104-2.

Accordingly, in (a) of FIG. 1, cache slashing occurs. Here, the case of "a (0)=b (0)", where j=0, will be described. At the time of prefetch occurring prior to a request for access to b (0), the information processing device 100, in which the storage area of b (0) is not allocated to the cache line 104-0 and therefore a cache miss occurs, allocates the storage area of b (0) to the cache line 104-0. Here, the storage area of b (0) and the storage area of a (0) correspond to the same cache line 104-0, and therefore, at this stage, the storage area of a (0) is not able to be allocated to the cache line 104-0. Then, at the time of a request for access to a (0), the information processing device 100, in which data of a (0) is not allocated to the cache line 104-0 and therefore a demand miss occurs, allocates the storage area of a (0) to the cache line 104-0. In such a manner, in the example in (a) of FIG. 1, many demand misses occur.

In order to determine whether or not cache thrashing has occurred, the information processing device 100 acquires the number of cache misses when dynamically reserving the storage areas of the arrays a and b for the first time. The number of cache misses is assumed to be able to be acquired from hardware counter information that the information processing device 100 has. The hardware counter information as used here is a generic name of information on floating-point instructions executed at run time of a program, the numbers of L1 and L2 cache misses, single instruction multiple data (SIMD) instruction information, and the like.

In the example illustrated in (a) of FIG. 1, as a result of many demand misses, cache thrashing has occurred in the information processing device 100. In (b) of FIG. 1, the example where padding is performed is illustrated. The padding size may be any size if it is a multiple of one cache line size. However, it is preferable that the padding size be half the size of the area of one way. With half the size of the area of one way, the likelihood that cache thrashing may be inhibited from occurring is highest. The reason for this is that, if padding corresponding to the size of the area of one way is performed, the likelihood that cache thrashing will occur is the same as in the case where no padding occurs, that is, the case where padding with a size of zero is performed.

Accordingly, with half the size of the area of one way, which has a value farthest from both the size of the area of one way and the size of zero, the likelihood that the presence or absence of cache thrashing will change is highest. Furthermore, if cache thrashing occurs in the case of a size of zero, half the size of the area of one way has a value at which the likelihood; likelihood that cache thrashing will not occur, that is, the likelihood that cache thrashing may be inhibited from occurring, is highest.

In (b) of FIG. 1, the state in which the storage areas of the arrays a and b are dynamically reserved for the second or more time is illustrated. Here, in (b) of FIG. 1, the example where padding of half the size of the area of one way, that is, padding of the size of two cache lines is performed is illustrated. Consequently, the storage areas of a (0) and b (2) correspond to the cache line 104-0. The storage area of a (1) corresponds to the cache line 104-1. The storage areas of a (2) and b (0) correspond to the cache line 104-2. The storage area of b (1) corresponds to the cache line 104-3.

Accordingly, in (b) of FIG. 1, cache thrashing does not occur. Here, as in the example in (a) of FIG. 1, the case of "a (0)=b (0)", where j=0, will be described. At the time of prefetch occurring prior to a request for access to b (0), in the information processing device 100, the storage area of b (0) is not allocated to the cache line 104-0. Therefore, a cache miss occurs, and the information processing device 100 allocates the storage area of b (0) to the cache line 104-2. Here, the storage area of b (0) and the storage area of a (0) correspond to different cache lines. Therefore, at this stage, the information processing device 100 is able to allocate the storage area of a (0) to the cache line 104-0. Accordingly, in the example of (b) of FIG. 1, a demand miss, which occurs in the example in (a) of FIG. 1, does not occur, and the information processing device 100 may inhibit cache thrashing from occurring. Next, the hardware configuration of the information processing device 100 will be described with reference to FIG. 2.

Figure 2:
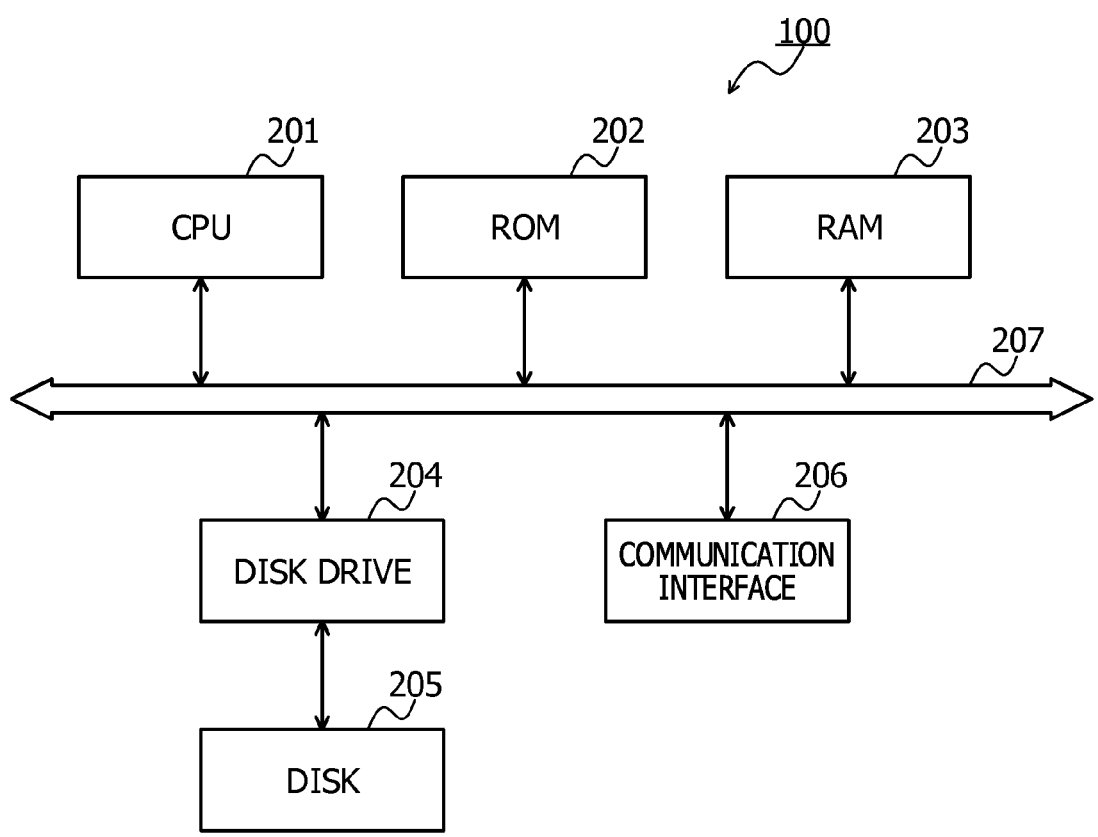
FIG. 2 is an explanatory diagram illustrating an example of a hardware configuration of the information processing device.

FIG. 2 is an explanatory diagram illustrating an example of a hardware configuration of the information processing device 100. In FIG. 2, the information processing device 100 includes a CPU 201, a read-only memory (ROM) 202, a random access memory (RAM) 203. The information processing device 100 includes a disk drive 204 as well as a disk 205, and a communication interface 206. The CPU 201 to the disk drive 204 and the communication interface 206 are each coupled via a bus 207. The storage unit 102 illustrated in FIG. 1 corresponds to the RAM 203.

The CPU 201 is a processing unit in charge of control over the entire information processing device 100. A management node may include a plurality of CPUs. The ROM 202 is a nonvolatile memory that stores programs such as a boot program. The RAM 203 is a volatile memory for use as a work area of the CPU 201.

The disk drive 204 is a control device that controls reading and writing of data from and to the disk 205 in accordance with control of the CPU 201. As the disk drive 204, for example, a magnetic disk drive, an optical disk drive, a solid state drive, or the like may be employed. The disk 205 is a nonvolatile memory that stores data written under control of the disk drive 204. For example, when the disk drive 204 is a magnetic disk drive, a magnetic disk may be employed as the disk 205. When the disk drive 204 is an optical disk drive, an optical disk may be employed as the disk 205. When the disk drive 204 is a solid state drive, a semiconductor memory formed of a semiconductor element, the so-called semiconductor disk, may be employed as the disk 205.

The communication interface 206 is a control device that handles networks and inner interfaces and controls input and output of data to and from other devices. Specifically, the communication interface 206 is coupled through a communication line via a network to other devices. As the communication interface 206, for example, a modem, a local area network (LAN) adapter, or the like may be employed.

When the administrator of the information processing device 100 directly operates the information processing device 100, the information processing device 100 may include hardware such as a display, a keyboard, and a mouse.

Figure 3:
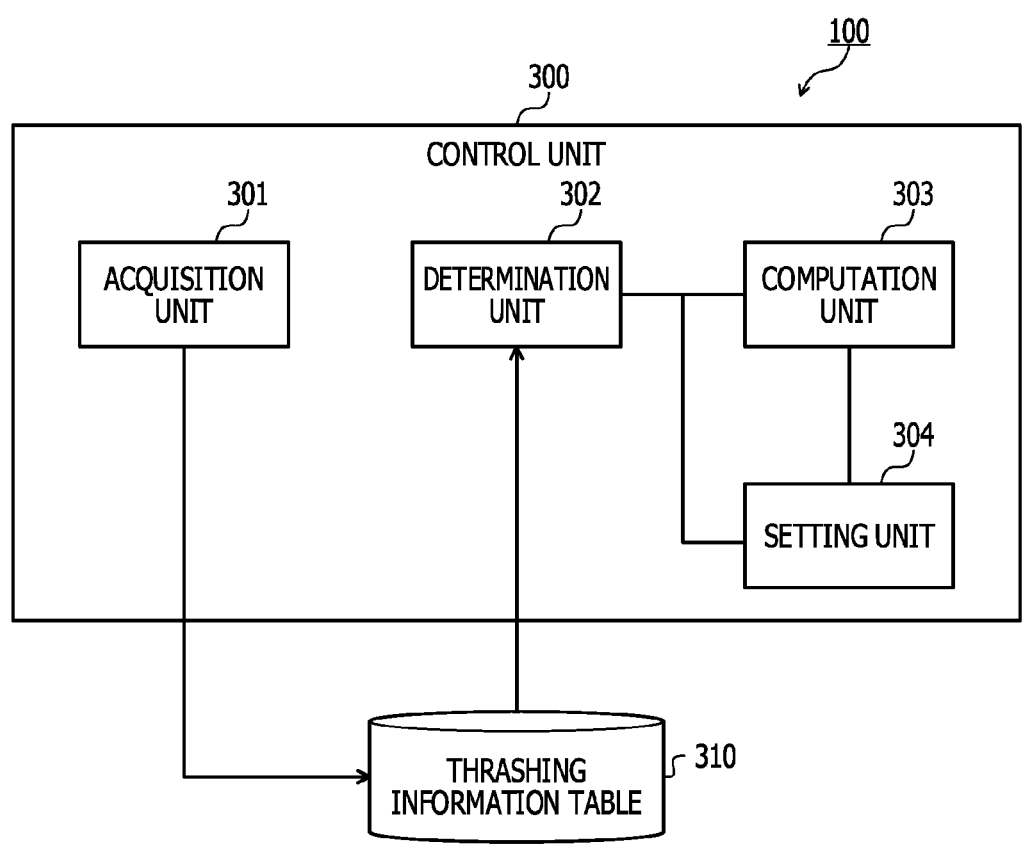
FIG. 3 is a block diagram illustrating an example of a functional configuration of the information processing device.

FIG. 3 is a block diagram illustrating an example of a functional configuration of the information processing device 100. The information processing device 100 includes a control unit 300. The control unit 300 includes an acquisition unit 301, a determination unit 302, a computation unit 303, and a setting unit 304. The control unit 300 implements the function of each unit by a program stored in a storage device being executed with the CPU 201. The storage device is specifically, for example, the ROM 202, the RAM 203, or the disk 205 illustrated in FIG. 2, or the like. A processing result of each unit is stored in a register of the CPU 201, a cache memory of the CPU 201, or the like.

The information processing device 100 is capable of accessing a thrashing information table 310. The thrashing information table 310 is a table that stores the number of cache misses. The thrashing information table 310 may store a cache miss ratio, which is the ratio of cache misses relative to load instructions and store instructions. The thrashing information table 310 is stored in a storage device such as the RAM 203 or the disk 205.

The acquisition unit 301 acquires the number of cache misses that have occurred in response to a request for access to a storage area reserved by a particular routine called by a request for reserving a storage area in the RAM 203.

The determination unit 302 determines whether or not the number of cache misses acquired by the acquisition unit 301 is larger than or equal to a given value. The determination unit 302 may determine whether or not the ratio of the number of cache misses acquired by the acquisition unit 301 relative to load instructions and store instructions, that is, the cache miss ratio is greater than or equal to a given ratio. Hereinafter, the given ratio is referred to as a cache miss ratio threshold. The cache miss ratio threshold may be a fixed value determined by the developer, or may be in accordance with an argument described within a program at the time of dynamically reserving an area.

The computation unit 303 computes the size by which a new storage area, when being reserved, is shifted, as a result of a plurality of reservation requests being performed, based on the size of one way and the number of times the cache miss ratio acquired by the acquisition unit 301 is larger than or equal to the cache miss ratio threshold. For example, the computation unit 303 may repeat subtraction of a value obtained by dividing the size of one way by two raised to the power of this number of times, from the size of one way, this number of times. For example, it is assumed that the size of one way is 16 KiB and the number of times the cache miss ratio acquired by the acquisition unit 301 is larger than or equal to the cache miss ratio threshold is three. In this example, the computation unit 303 computes the size as follows: $16-(16/2^1)-(16/2^2)-(16/2^3)=16-8-4-2=2$ KiB.

The computation unit 303 may compute the size by which a new storage area, when being reserved, is shifted from a storage area reserved for the first time, or may compute the size by which the new storage area is shifted from a storage area reserved last time.

The computation unit 303 may compute, as a result of a plurality of reservation requests being performed, the size by which a new storage area is shifted when being reserved, by dividing the size of one way by two raised to the power of the number of times. For example, it is assumed that the size of one way is 16 KiB and the number of times the cache miss ratio acquired by the acquisition unit 301 is larger than or equal to the cache miss ratio threshold is two. At this point, the computation unit 303 computes the size by which a new storage area is shifted when being reserved, as follows: $16/2^2=4$ KiB.

The setting unit 304 sets a new storage area reserved by a particular routine called by a reservation request so as to shift the new storage area from a reserved storage area. The setting unit 304 may set a new storage area so as to shift the new storage area from a reserved storage area by half the size of one way. The setting unit 304 may set a new storage area so as to shift the new storage area from a reserved storage area by the size computed by the computation unit 303. Here, the direction in which the new storage area is shifted may be a direction in which a value corresponding to the size of half the size of one way or the size computed by the computation unit 303 is increased, or in a direction in which the value is decreased.

Figure 4:
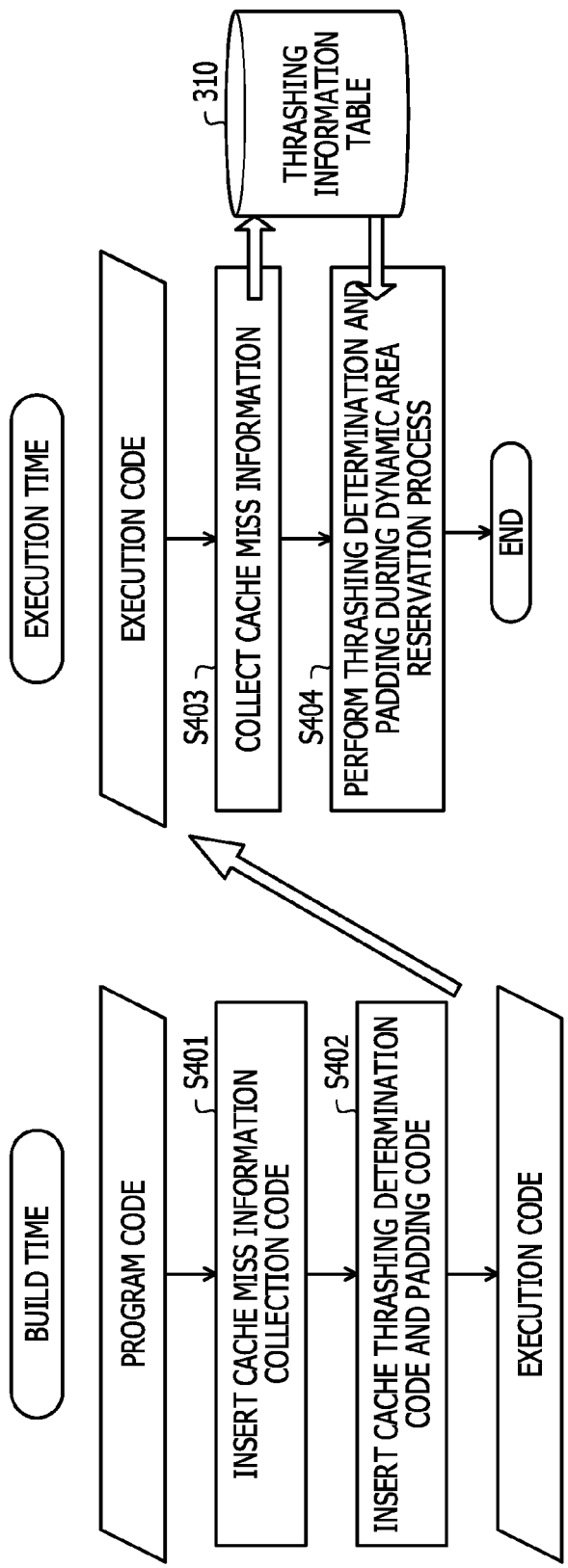
FIG. 4 is an explanatory diagram illustrating an example of operation at build time and an example of operation at run time.

FIG. 4 is an explanatory diagram illustrating an example of operation at build time and an example of operation at run time. With reference to FIG. 4, operation at build time for setting a suitable padding size and the operation at run time are described. Here, the unit that operates at build time may be the information processing device 100 or may be another device. In FIG. 4, for the sake of easy explanation, it is assumed that the information processing device 100 performs the build.

Figure 5:
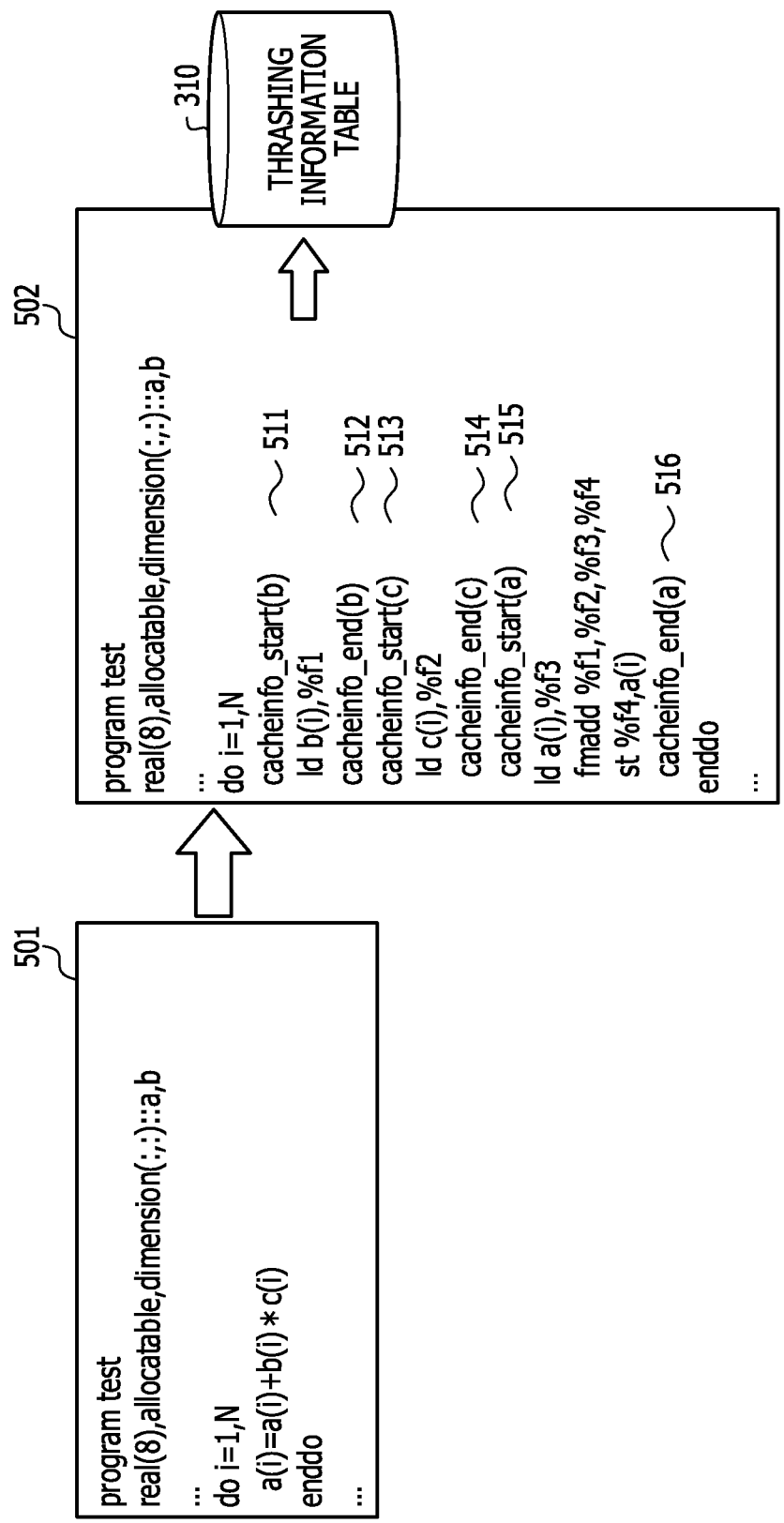
FIG. 5 is an explanatory diagram illustrating an example of inserting cache miss information collection code.

At build time, the information processing device 100, when compiling program code, inserts cache miss information collection code into the program code (S401). A specific example of inserting cache miss information collection code is illustrated in FIG. 5. Next, the information processing device 100 inserts cache thrashing determination code and padding code into the program code (S402). Specifically, the information processing device 100 links an object obtained by compiling the program code and a load module including the cache thrashing determination code and the padding code, thereby obtaining execution code. When the cache thrashing determination code or the padding code is executed, the information processing device 100 may dynamically link the load module mentioned above with an object obtained by compiling the program code.

Figure 6A:
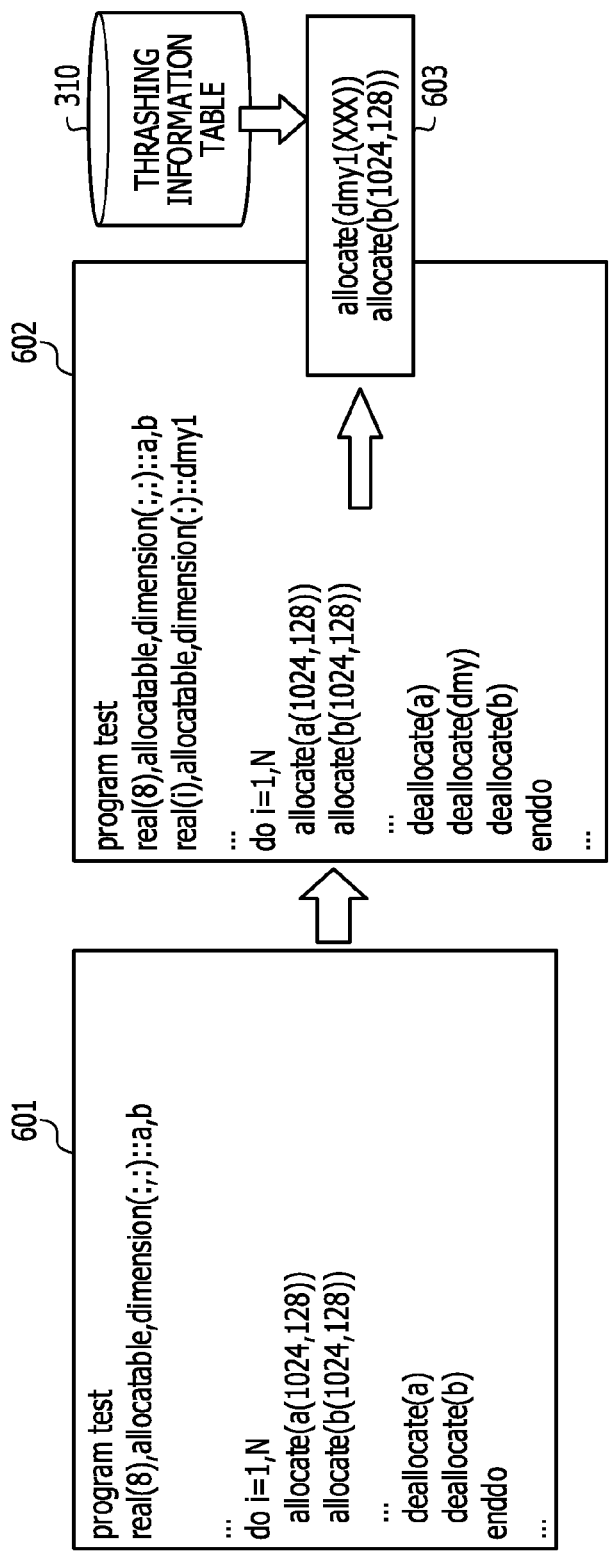
FIG. 6A and FIG. 6B are explanatory diagrams illustrating an example of operation of performing padding.
Figure 6B:
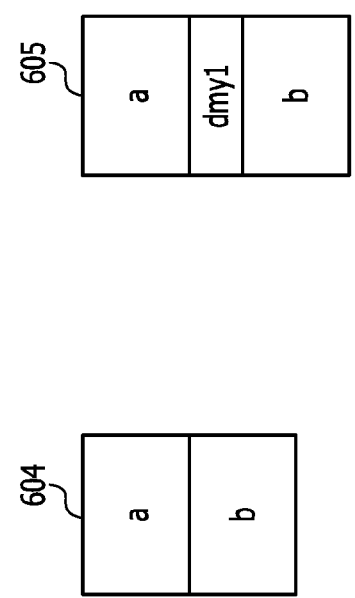

Next, at run time of the execution code, the information processing device 100 collects cache miss information by the cache miss information collection code being executed (S403). The collected cache miss information is stored in the thrashing information table 310. The information processing device 100 then refers to the thrashing information table 310 and performs thrashing determination and padding during a dynamic area reservation process (S404). A specific example of performing padding is illustrated in FIG. 6A and FIG. 6B. An example of calculating a padding size is illustrated in FIG. 7A, FIGS. 7B, and 7C.

FIG. 5 is an explanatory diagram illustrating an example of inserting cache miss information collection code. FIG. 5 illustrates the example of inserting cache miss information collection code at build time. In program code 501, a state before insertion of the cache miss information collection code is represented. In program code 502, a state after insertion of the cache miss information collection code is represented. The example illustrated in FIG. 5 is an example of the cache miss information collection code for arrays a, b, and c within the program code 501. In the program code 502, the example in which cache miss information collection code is inserted into assembly code obtained by compiling "a(i)=a(i)+b(i)*c(i)" described in the program code 501 is represented.

Code 511 to 516 in the program code 502 is the cache miss information collection code. Specifically, the code 511 and 512 is cache miss information collection code for the array b. Similarly, the code 513 and 514 is cache miss information collection code for the array c. The code 515 and 516 is cache miss information collection code for the array a. Here, information collected by the code 511 to 516 will be described in conjunction with FIG. 8. The information processing device 100 stores cache miss information collected by the code 511 to 516 in the thrashing information table 310.

FIG. 6A and FIG. 6B are explanatory diagrams illustrating an example of operation of performing padding. FIG. 6A illustrates an example of operation of performing padding during the area reservation process. Execution code 601 represents a state after the program code is compiled. Here, the execution code 601 is assumed to repeat N times a series of processing in which the areas of the arrays a and b are reserved, processing for the arrays a and b is performed, and the areas of the arrays a and b are released.

Execution code 602 represents an image when the execution code 601 is executed. In the execution code 602, it is assumed that padding is performed for the array b. Specifically, the information processing device 100, upon detecting "allocate" that calls the dynamic area reservation process, during running of the execution code 601, calls the load module including the cache thrashing determination code and the padding code, as a particular routine. Then, the information processing device 100 performs cache thrashing determination. Other examples of the name for calling the dynamic area reservation process include "malloc".

In the example in FIG. 6A, the information processing device 100 determines that cache thrashing is present and performs padding. A variable representing a storage area related to a padding size is "real(i),allocatable,dimension (:)::dmy1" within the execution code 602. The information processing device 100 performs padding by, as represented by code 603, reserving the storage area of dmy1 prior to reserving the area of the array b. FIG. 6B illustrates storage areas reserved for the arrays a and b in schematic form. Reference numeral 604 denotes the case without padding and a state in which the storage area of the array a and the storage area of the array b are arranged continuously. Reference numeral 605 denotes the case with padding and a state in which a storage area of dmy1 is arranged between the storage area of the array a and the storage area of the array b. A specific example of computing a padding size is illustrated in conjunction with FIG. 7A to FIG. 7C.

FIG. 7A, FIG. 7B, and FIG. 7C are explanatory diagrams illustrating an example of computing a padding size. The information processing device 100 sets the size of first padding to be half the data size of one way, sets the size of second padding to be one fourth of the data size of one way, and sets the sizes of padding similarly until the padding size reaches the size of one cache line. When generalized, the size of Nth padding is given by the following formula (1).

$$\text{Padding size} = \text{data size of one way}/2^N \qquad (1)$$

The condition for repeating padding is that when, as a result of (N−1)th padding, the cache miss ratio has changed by a certain number or more, Nth padding be performed. For example, description is given of the case of a level 1 data (L1D) cache having a size of 64 KiB, one cache line being 256 byte, and four ways. In this case, the data size of one way is 64 KiB/4=16 KiB. Consequently, the information processing device 100, following formula (1), sets the first padding size to 16/2^1=8 KiB. Next, assuming that, as a result of the first padding, the number of cache misses has changed by a certain number or more, the information processing device 100 sets the size of second padding to 16/2^2=4 KiB.

FIG. 7A, FIG. 7B, and FIG. 7C illustrate the example where no padding is performed and cache thrashing occurs and the example where padding is performed once and thus the occurrence of cache thrashing may be avoided. More specifically, FIG. 7A illustrates the example where arrays a, b, c, d, and e, each having a size of 16 KiB, are reserved. FIG. 7B illustrates the example where, when none of the arrays a, b, c, d, and e is padded, cache thrashing occurs. Specifically, e (1) conflicts with one of a (1) to d (1) over the cache line, and therefore one of ways 1 to 4 is overwritten, which leads to the occurrence of cache thrashing.

Next, FIG. 7C illustrates the example where the array e is padded such that 8 KiB precedes the array e. In this case, e (1) differs from all of a (1) to d (1) in terms of the corresponding cache line. Therefore, overwriting does not occur and the occurrence of cache thrashing may be avoided. Elements a (1) to d (1) are allocated to the same cache line. However, since L1D cache has four ways, no conflict occurs.

Figure 8:
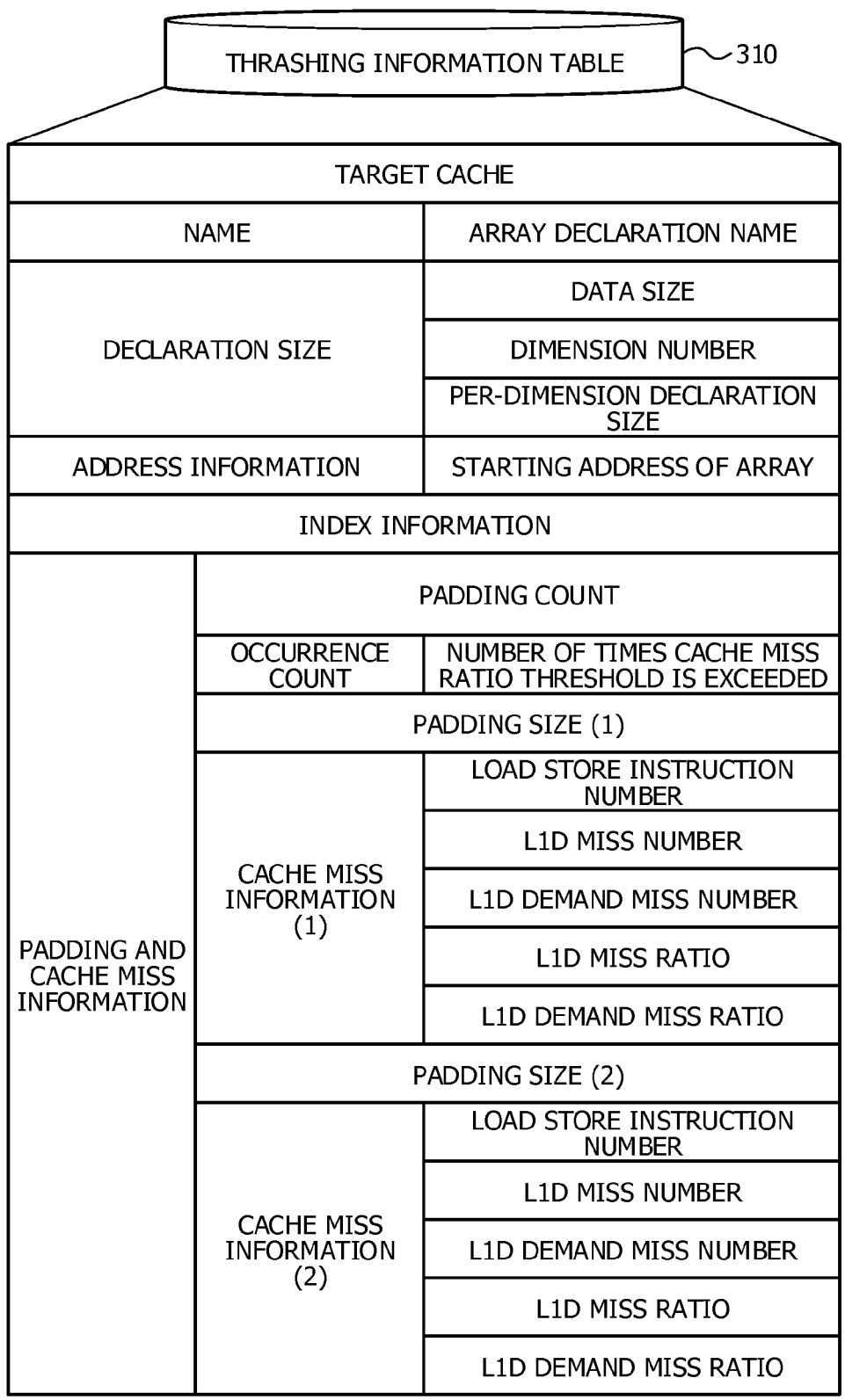
FIG. 8 is an explanatory diagram (1) illustrating an example of storage content of a thrashing information table.

FIG. 8 is an explanatory diagram (1) illustrating an example of storage content of the thrashing information table 310. The thrashing information table 310 includes fields named as target cache, name, declaration size, address information, index information, and padding and cache miss information.

In the target cache field, the name of a targeted cache is stored. The name field includes an array declaration name field. In the array declaration name field, the declaration name of an array is stored. The declaration size field includes fields named as data size, dimension number, and per-dimension declaration size. In the data size field, the data size corresponding to one element of an array is stored. In the dimension number field, the number of dimensions of an array is stored. In the per-dimension declaration size field, a declaration size is stored for each dimension of an array.

In the address information field, the starting address of an array is stored. In the index information field, the index of each dimension is stored.

The padding and cache miss information field includes fields named as padding count, occurrence count, and padding size and cache miss information in each cycle. In the padding count field, the number of times the padding size is changed when areas are dynamically reserved. In the occurrence count field, the number of times the cache miss ratio threshold is exceeded is stored. In the padding size field in each cycle, the size of padding between arrays in the cycle is stored. The cache miss information in each cycle consists of the number of load store instructions in the cycle, and the number of L1D misses, the number of L1D demand misses, the L1D miss ratio, and the L1D demand miss ratio in the cycle. The code 511 to 516 illustrated in FIG. 5 is code for acquiring the number of load store instructions to the number of L1D demand misses in each cycle.

In the load store instruction number field in each cycle, the total number of load instructions and store instructions in the cycle is stored. In the L1D miss number field in each cycle, the number of times a cache miss of data to the L1 cache memory has occurred in the cycle is stored. More specifically, in the L1D miss number field in each cycle, the total number of the number of times a cache miss has occurred when data is prefetched to the L1 cache memory and the number of times a demand miss for the L1 cache memory has occurred is stored. In the L1D demand miss number field in each cycle, the number of times a demand miss for the L1 cache memory has occurred in the cycle is stored.

In the L1D miss ratio field in each cycle, the ratio of cache misses to load store instructions is stored. Specifically, in the L1D miss ratio field in each cycle, the L1D miss ratio computed by the following formula (2) is stored.

$$\begin{aligned}\text{L1D miss ratio} = &\text{value of L1D miss number field in}\\ &\text{each cycle/value of load store instruction num-}\\ &\text{ber field in the cycle}\end{aligned} \qquad (2)$$

In the L1D demand miss ratio field in each cycle, the ratio of demand misses to cache misses is stored. Specifically, in the L1D demand miss ratio field in each cycle, the L1D demand miss ratio computed by the following formula (3) is stored.

$$\begin{aligned}\text{L1D demand miss ratio} = &\text{value of L1D demand miss}\\ &\text{number field in each cycle/value of L1D miss}\\ &\text{number field in the cycle}\end{aligned} \qquad (3)$$

The information processing device 100 uses the L1D miss ratio and the L1D demand miss ratio to determine whether or not cache thrashing has occurred. Specifically, the information processing device 100 determines that cache thrashing has occurred, if the L1D miss ratio and the L1D demand miss ratio are greater than or equal to the threshold of the L1D miss ratio and the threshold of the L1D demand miss ratio, which are cache miss ratio thresholds, respectively.

The threshold of the L1D miss ratio is assumed to be, for example, 1.563% when one element has a size of single-precision data, and 3.125% when one element has a size of double-precision data. The respective numerical values mean that, with four-byte single-precision data, a cache miss occurs once in every 256/4=64 times of consecutive access, and that, with eight-byte double-precision data, a cache miss occurs once in every 256/8=32 times of consecutive access.

The threshold of the L1D demand miss ratio is, for example, 20%. This value, 20%, is a numerical value obtained by the rule of thumb of cache thrashing. Next, specific values that may be stored in the thrashing information table 310 will be described in conjunction with FIG. 9.

FIG. 9 is an explanatory diagram (2) illustrating an example of storage content of the thrashing information table 310. Here, records 1A, 1B, 2A, and 2B illustrated in FIG. 9 indicate values obtained before processing in S404 illustrated in FIG. 4 is performed in a first cycle, values obtained after the processing is performed in the first cycle, values obtained before the processing is performed in a second cycle, and values obtained after the processing is performed in the second cycle, respectively. Leftwards arrows illustrated in FIG. 9, for convenience in writing in the drawing, indicate the same values as the values of items on the left side of the arrows. In FIG. 9, an example of the L1D cache having a size of 64 KiB, one cache line being 256 bytes, and four ways, which is illustrated in FIG. 7, is used.

The record 1A indicates that the array declaration name is "ABC", one element is 8 bytes, the number of dimensions is three, the declaration sizes of dimensions are 256, 128, 64, and the starting address of an array is 1000000000. The record 1A further indicates that the index information is 256, 128, 64, the padding count is zero, the occurrence count is zero, the number of load store instructions is 10000, the number of L1D misses is 500, and the number of L1D demand misses is 200.

Next, as indicated by the record 1B, the information processing device 100 computes the L1D miss ratio and the L1D demand miss ratio to be 5.00% and 40%, from the content of the record 1A, using formula (2) and formula (3), respectively. The L1D miss ratio and the L1D demand miss ratio are over the cache miss ratio threshold. From this reason, the information processing device 100 determines that cache thrashing has occurred, and sets the padding size to 8192 byte (8 KiB). As indicated by the record 1B, the information processing device 100 sets the padding count and the occurrence count to one and sets the starting address of the array to 1000008192, which results from addition of the padding size.

Next, the record 2A indicates that, regarding an array indicated as ABC in the processing in the second cycle, the number of load store instructions is 10000, the number of L1D misses is 400, and the number of L1D demand misses is 120.

As indicated by the record 2B, the information processing device 100 computes the L1D miss ratio and the L1D demand miss ratio to be 4.00% and 30%, from the content of the record 2A, using formula (2) and formula (3), respectively. The L1D miss ratio and the L1D demand miss ratio are over the cache miss ratio threshold. From this reason, the information processing device 100 determines that cache thrashing has occurred, and sets the padding size to 4096 byte (4 KiB). As indicated by the record 2B, the information processing device 100 sets the padding count and the occurrence count to two. The information processing device 100 adds the padding size and sets the starting address of the array to 1000004096.

Next, a flowchart illustrating operation performed by the information processing device 100 will be described with reference to FIG. 10 to FIG. 13.

Figure 10:
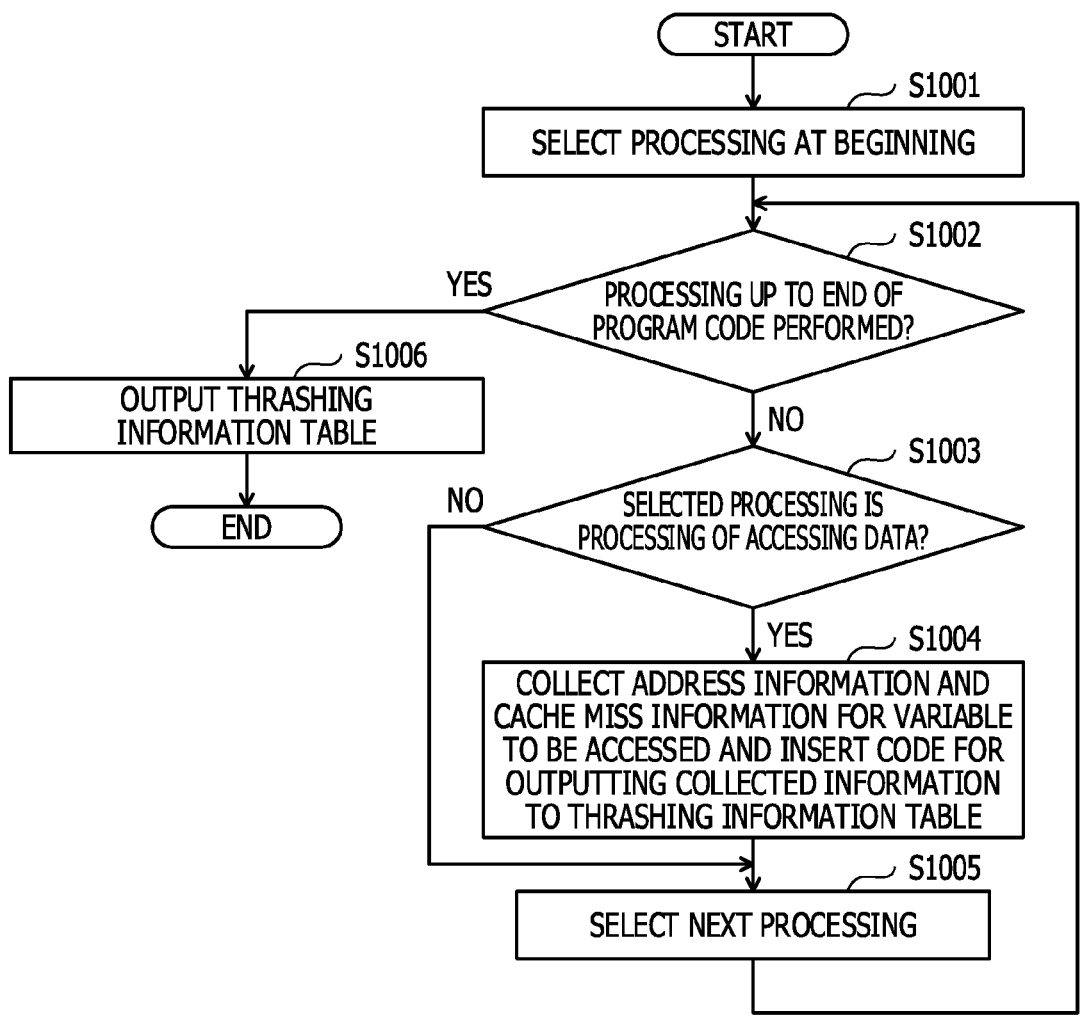
FIG. 10 is a flowchart illustrating an example of a procedure of a cache-miss-information-collection-code insertion process.

FIG. 10 is a flowchart illustrating an example of a procedure of a cache-miss-information-collection-code insertion process. The cache-miss-information-collection-code insertion process is a process for inserting cache miss information collection code into program code. The cache-miss-information-collection-code insertion process may be executed by the information processing device 100 or may be executed by another device. With reference to FIG. 10, description is given using an example where the information processing device 100 executes the process.

The information processing device 100 selects processing at the beginning of the program code (S1001). Next, the information processing device 100 determines whether or not processing up to the end of the program code has been performed (S1002). The case where processing up to the end of the program code has been performed is specifically, for example, the case where processing next to the processing in S1005 is absent.

If it is determined that processing up to the end of the program code has not been performed (S1002: No), the information processing device 100 determines whether or not the selected processing is processing of accessing data (S1003). If it is determined that the selected processing is processing of accessing data (S1003: Yes), the information processing device 100 collects address information and cache miss information for a variable to be accessed and inserts code for outputting the collected information to thrashing information table (S1004).

After completion of the processing in S1004, or if it is determined that the selected processing is not processing of accessing data (S1003: No), the information processing device 100 selects the next processing (S1005). Then, the information processing device 100 proceeds to processing in S1002.

If it is determined that processing up to the end of the program code has been performed (S1002: Yes), the information processing device 100 outputs the thrashing information table 310 (S1006). After completion of the processing in S1006, the information processing device 100 completes the cache-miss-information-collection-code insertion process. The information processing device 100 executes the cache-miss-information-collection-code insertion process and thus may insert code for inserting cache miss information while execution code is running.

Figure 11:
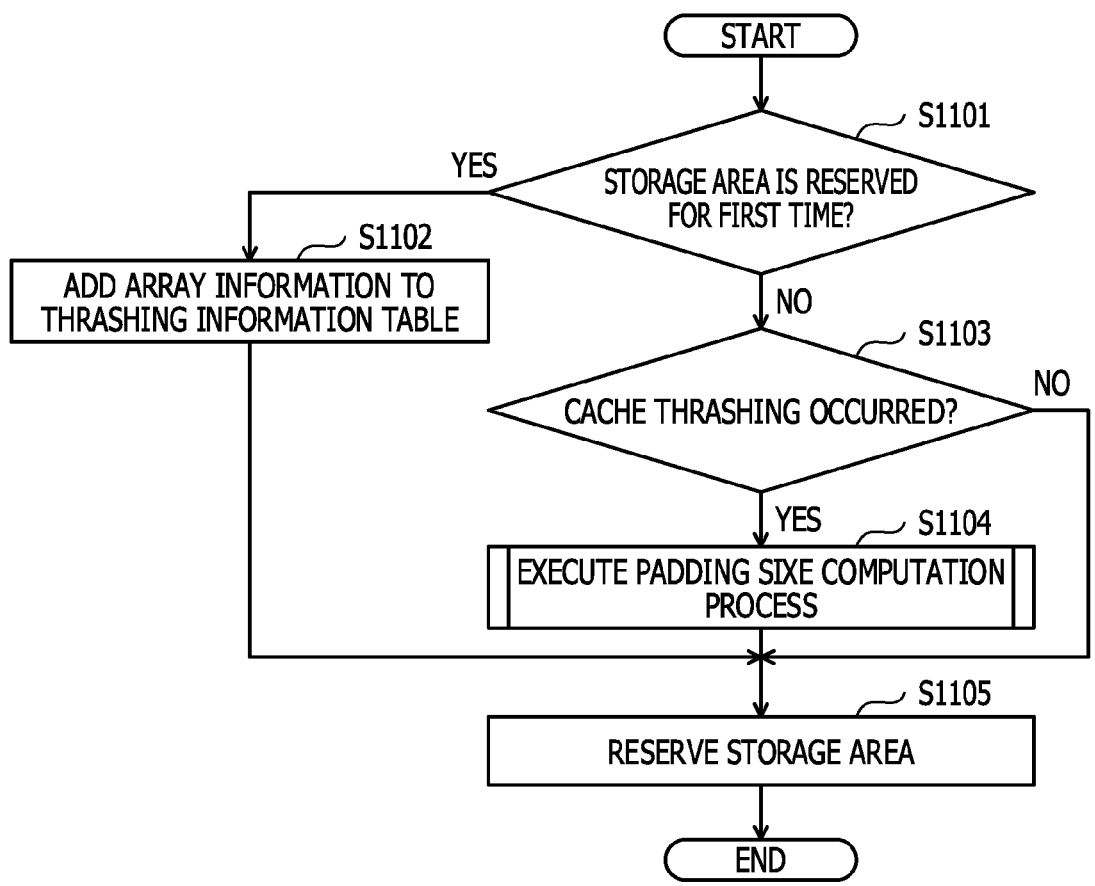
FIG. 11 is a flowchart illustrating an example of a procedure of a dynamic area reservation process.

FIG. 11 is a flowchart illustrating an example of a procedure of the dynamic area reservation process. The dynamic area reservation process is a process of dynamically reserving a storage area. The dynamic area reservation process is a process executed when a call for the dynamic area reservation process is detected in the execution code.

The information processing device 100 determines whether or not a storage area is reserved for the first time for an array for which the reservation is performed (S1101). A criterion for determining whether or not the storage area is reserved for the first time is whether or not the array for which the reservation is performed is registered in the thrashing information table 310. Additionally, the information processing device 100, when having detected a call for re-execution of the dynamic area reservation process, may determine that this reservation is performed for the second time or later. Examples of the name of a call for re-execution of the dynamic area reservation process include "reallocate" and "realloc".

If it is determined that the storage area is reserved for the first time for an array for which the reservation is performed (S1101: Yes), the information processing device 100 adds array information to the thrashing information table 310 (S1102). Here, the array information is information in the name, declaration address, address information, and index information fields in the thrashing information table 310. Additionally, the information processing device 100 sets the padding count and occurrence count fields to zero.

On the other hand, if it is determined that the storage area is reserved for the second time or later for an array for which the reservation is performed (S1101: No), the information processing device 100 determines whether or not cache thrashing has occurred (S1103). One of the ways to determine whether or not cache thrashing has occurred uses the threshold of the L1D miss ratio and the threshold of the L1D demand miss ratio, as illustrated in FIG. 8.

If it is determined that cache thrashing has occurred (S1103: Yes), the information processing device 100 executes a padding size computation process (S1104). Details of the padding size computation process will be described in conjunction with FIG. 12.

After the processing of S1102 and S1104 is completed, or if cache thrashing has not occurred (S1103: No), the information processing device 100 reserves a storage area (S1105). Here, after the processing of S1104 has been performed, the information processing device 100 reserves an area corresponding to the padding size and then reserves a storage area for an array for which the reservation is performed. After completion of the processing of S1105, the information processing device 100 completes the dynamic area reservation process. The information processing device 100 executes the dynamic area reservation process and thus may reserve a storage area in response to a call for invoking the dynamic area reservation process.

Figure 12:
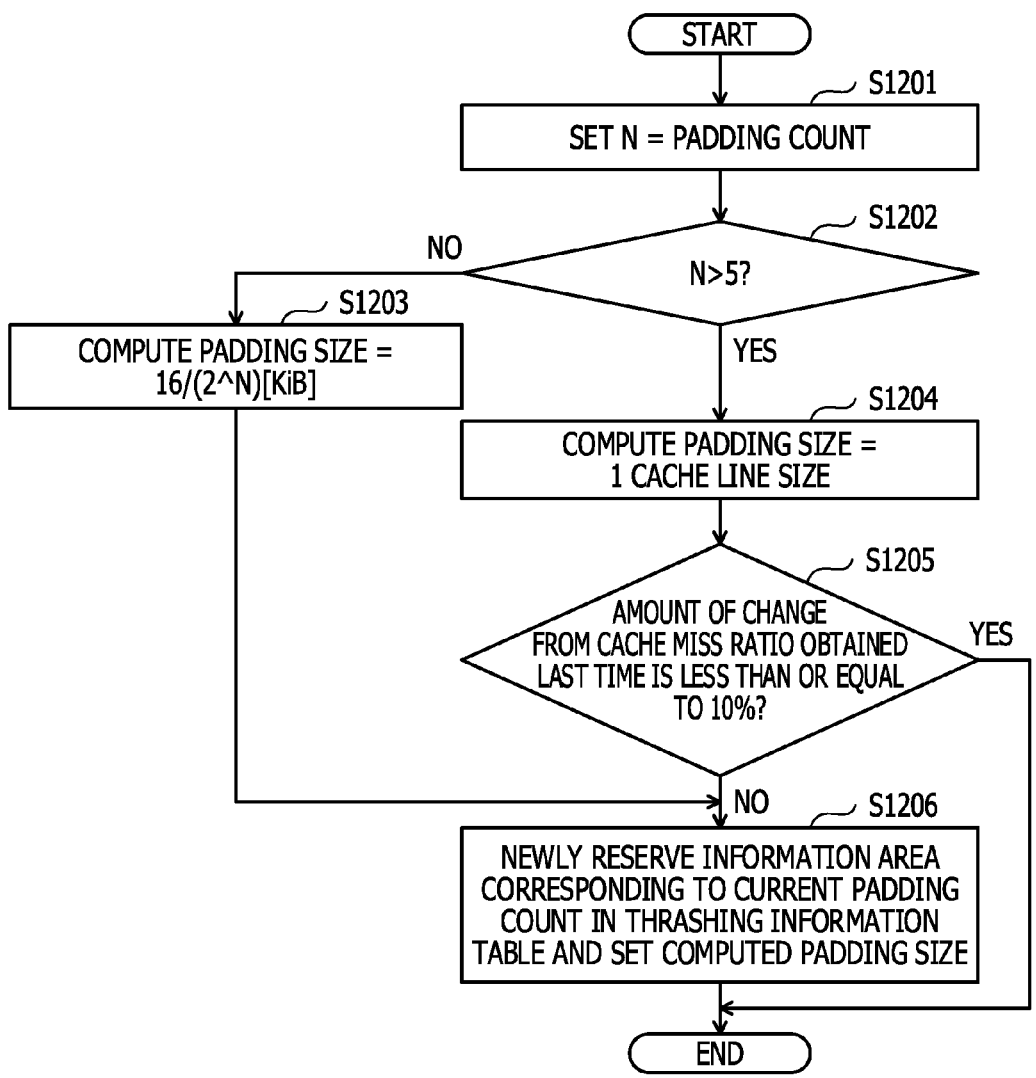
FIG. 12 is a flowchart illustrating an example of a procedure of a padding size computation process.

FIG. 12 is a flowchart illustrating an example of a procedure of the padding size computation process. The padding size computation process is a process of computing the data size of padding that is set such that a pad precedes a storage area to be reserved. The flowchart illustrated in FIG. 12 illustrates, by way of example, the case of an L1D cache having a size of 64 KiB, one cache line being 256 bytes, and four ways.

The information processing device 100 sets the padding count to N (S1201). Next, the information processing device 100 determines whether or not N is larger than five (S1202). If it is determined that N is less than or equal to five (S1202: No), the information processing device 100 computes the padding size to be 16/(2^N) KiB (S1203).

On the other hand, if it is determined that N is larger than five (S1202: Yes), the information processing device 100 computes the padding size to be one cache line size (S1204). Next, the information processing device 100 determines whether or not the amount of change from the cache miss ratio obtained last time is less than or equal to 10% (S1205). In S1205, the information processing device 100 may determine a yes answer if both of the L1D miss ratio and the L1D demand miss ratio, which constitute the amount of change in the cache miss ratio, are less than or equal to 10%, or may determine a yes answer if either of the L1D miss ratio and the L1D demand miss ratio is less than or equal to 10%.

After the processing of S1203 is completed, or if it is determined that the amount of change from the cache miss ratio obtained last time is larger than 10% (S1205: No), the information processing device 100 newly reserves an information area corresponding to the current padding count in the thrashing information table 310 and sets the computed padding size (S1206). The information processing device 100 increments the occurrence count in the thrashing information table 310.

After the processing of S1206 is completed, or it is determined that the amount of change from the cache miss ratio obtained last time is less than or equal to 10% (S1205: Yes), the information processing device 100 completes the padding size computation process. The information processing device 100 executes the padding size computation process and thus may compute a suitable padding size.

Figure 13:
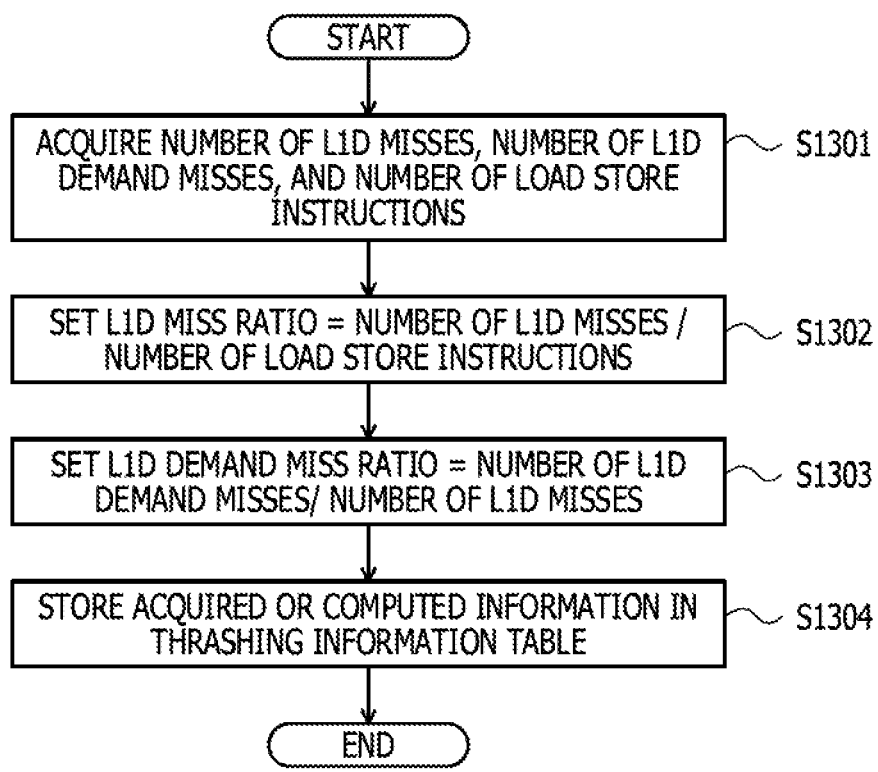
FIG. 13 is a flowchart illustrating an example of a procedure of a cache miss information collection process.

FIG. 13 is a flowchart illustrating an example of a procedure of a cache miss information collection process. The cache miss information collection process is a process of collecting cache miss information.

The information processing device 100 acquires the number of L1D misses, the number of L1D demand misses, and the number of load store instructions (S1301). Next, the information processing device 100 sets the L1D miss ratio to be the number of L1D misses/the number of load store instructions (S1302). Subsequently, the information processing device 100 sets the L1D demand miss ratio to be the number of L1D demand misses/the number of L1D misses (S1303). The information processing device 100 then stores the acquired or computed information in the thrashing information table 310 (S1304). After completion of the processing of S1304, the information processing device 100 completes the cache miss information collection process. The information processing device 100 executes the cache miss information collection process and thus may collect cache miss information.

As described above, with the information processing device 100, if it is determined that the cache miss ratio of the reserved storage area is greater than or equal to the cache miss ratio threshold, that is, cache thrashing has occurred, a new storage area is set so as to be shifted from the reserved storage area. Thus, a new storage area is allocated to a cache line different from a cache line where a conflict has occurred, and therefore the information processing device 100 may inhibit cache thrashing from occurring.

Furthermore, with the information processing device 100, a new storage area may be set so as to be shifted from a reserved storage area by half the size of one way. Thus, the information processing device 100 may provide the highest likelihood that cache thrashing will be inhibited from occurring.

Furthermore, with the information processing device 100, as a result of a plurality of reservation requests, based on the size of one way and the number of times cache thrashing has occurred, the size by which a new storage area is shifted when being reserved may be computed. As described above, with the size of half the size of one way, the likelihood that cache thrashing will be inhibited from occurring is highest. However, cache thrashing is not necessarily inhibited from occurring.

For example, using the example of FIG. 1, the case where code "a(j)=b(j)+b(j+2)" is described in the execution code 101 is assumed. In this case, when padding is not performed, as described with reference to (a) of FIG. 1, since, for j=0, the storage areas of a (0) and b (0) correspond to the same cache line, cache thrashing occurs. When, in accordance with the example in (b) of FIG. 1, padding is performed by the size of two cache lines, since this time, for j=0, the storage areas of a (0) and b (2) correspond to the same cache line, cache thrashing occurs. Accordingly, in this example, with the information processing device 100, when padding is performed by the size of one cache line, for j=0, the storage areas of a (0), b (0), and b (2) correspond to respectively different cache lines; therefore, cache thrashing may be inhibited from occurring. In such a way, the information processing device 100 may adjust a padding size and thus inhibit cache thrashing from occurring.

According to the data processing method described in the present embodiment, once padding is performed such that a pad precedes a certain array, the presence of absence of occurrence of cache thrashing for the following array changes. As a result, there is a likelihood that cache thrashing will newly occur at a position where cache thrashing has not occurred. However, a portion where cache thrashing has occurred is identified and padding is performed. Therefore, the information processing device 100 may eventually cause all the portions to approach a state where cache thrashing does not occur.

The data processing method described in the present embodiment may be implemented by a program provided in advance being executed by a computer such as a personal computer or a work station. The present data processing program is recorded on a computer-readable recording medium, such as a hard disk, a flexible disk, a compact disc-read only memory (CD-ROM), or a digital versatile disk (DVD) and is executed by being read from the recording medium by the computer. The present data processing program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data processing method executed by a processor included in an information processing device, the data processing method comprising:
    reserving, in a memory coupled to the processor, a first storage area for a first data array that includes first data, and a second storage area for a second data array that includes second data, when a reservation request is detected, both the first data and the second data corresponding to a first cache line among a plurality of cache lines serially arranged in a cache memory;
    acquiring a number of cache misses indicating that desired data is not capable of being read from the first cache line, the cache misses having occurred in response to a request for access to one of the first storage area and the second storage area;
    when it is determined that the acquired number of cache misses is larger than or equal to a given value, acquiring a data size obtained by dividing a memory size of the cache memory by a number of the plurality of cache lines, and a number of times that a cache miss ratio has become equal to or larger than a threshold as a result of a plurality of reservation requests being received;
    calculating a padding size for the second data array by repeating subtracting a value from the data size the number of times, the value being obtained by dividing the data size by two raised to a power of the number of times; and
    setting a new storage area for the second data array, such that the second data correspond to a second cache line different from the first cache line among the plurality of cache lines, by shifting the second storage area along the first storage area by the calculated padding size.

2. The data processing method according to claim 1, further comprising
    computing the given value by multiplying, by a predetermined ratio, a total value of the load instructions and the store instructions obtained when the processor operated last time.

3. The data processing method according to claim 1, wherein the reserving includes:
    calling a particular routine when the reservation request is detected, and
    reserving one of the first storage area and the second storage area of the memory by executing the particular routine.

4. The data processing method according to claim 3, wherein the setting includes setting the new storage area by executing the particular routine.

5. The data processing method according to claim 1, wherein the setting includes setting the new storage area after reserving a dummy storage area as the padding size.

6. The data processing method according to claim 1, wherein the setting includes:
    determining a starting address of the new storage area by adding a predetermined value to a starting address of the second storage area originally scheduled to be reserved, and
    reserving the new storage area corresponding to the determined starting address.

7. The data processing method according to claim 1, wherein the setting includes:
    determining a starting address of the new storage area by subtracting a predetermined value from a starting address of the second storage area originally scheduled to be reserved, when an area preceding the second storage area originally scheduled to be reserved is released, and
    reserving the new storage area corresponding to the determined starting address.

8. The data processing method according to claim 1, wherein the setting includes setting the new storage area so as to shift the new storage area from the reserved area by half a size of an area obtained by dividing the cache memory by the number of the plurality of cache lines.

9. The data processing method according to claim 8, wherein the setting includes:
    as a result of detecting the reservation request a plurality of times, based on a size of the area obtained by the dividing and a number of times the acquired number of cache misses is larger than or equal to the given value, computing a size by which the new storage area is shifted when the new storage area is reserved, and
    setting the new storage area so as to shift the new storage area from the reserved storage area by the computed size.

10. The data processing method according to claim 9, wherein the computing includes computing a size by which the new storage area is shifted, by dividing, by two to a power of the number of times, the size of the area obtained by the dividing.

11. An information processing device, comprising:
    a memory; and
    a processor coupled to the memory and configured to:
        reserve, in the memory, a first storage area for a first data array that includes first data, and a second storage area for a second data array that includes second data, when a reservation request is detected, both the first data and the second data corresponding to a first cache line among a plurality of cache lines serially arranged in a cache memory,
        acquire a number of cache misses indicating that desired data is not capable of being read from the first cache line, the cache misses having occurred in response to a request for access to one of the first storage area and the second storage area;

when it is determined that the acquired number of cache misses is larger than or equal to a given value, acquire a data size obtained by dividing a memory size of the cache memory by a number of the plurality of cache lines, and a number of times that a cache miss ratio has become equal to or larger than a threshold as a result of a plurality of reservation requests being received;

calculate a padding size for the second data array by repeating subtracting a value from the data size the number of times, the value being obtained by dividing the data size by two raised to a power of the number of times; and set a new storage area for the second data array, such that the second data correspond to a second cache line different from the first cache line among the plurality of cache lines, by shifting the second storage area along the first storage area by the calculated padding size.

12. A non-transitory computer-readable recording medium that causes a processor included in an information processing apparatus to execute a process, the process comprising:

reserving, in a memory coupled to the processor, a first storage area for a first data array that includes first data, and a second storage area for a second data array that includes second data, when a reservation request is detected, both the first data and the second data corresponding to a first cache line among a plurality of cache lines serially arranged in a cache memory;

acquiring a number of cache misses indicating that desired data is not capable of being read from the first cache line, the cache misses having occurred in response to a request for access to one of the first storage area and the second storage area;

when it is determined that the acquired number of cache misses is larger than or equal to a given value, acquiring a data size obtained by dividing a memory size of the cache memory by a number of the plurality of cache lines, and a number of times that a cache miss ratio has become equal to or larger than a threshold as a result of a plurality of reservation requests being received;

calculating a data size of a padding for the second data array by repeating subtracting a value from the data size the number of times, the value being obtained by dividing the data size by two raised to a power of the number of times; and setting a new storage area for the second data array, such that the second data correspond to a second cache line different from the first cache line among the plurality of cache lines, by shifting the second storage area along the first storage area by the calculated padding size.

13. The data processing method according to claim 1, wherein the setting includes:

determining a new starting address by adding a predetermined value to a starting address of the second storage area originally scheduled to be reserved when designation of addresses to be reserved is allowable, and reserving the new storage area corresponding to the determined new starting address.

14. The data processing method according to claim 1, wherein an address of the first cache line is the same as an address of the first data and an address of the second data, and an address of the second cache line is not the same as the address of the second data.

15. The data processing method according to claim 14, wherein low-order bits of a starting address of the first storage area is the same as the address of the first cache line.

16. The data processing method according to claim 1, wherein the data size is obtained by dividing the cache memory by a number of cache lines respectively associated with any of storage areas in the memory.

17. The data processing method according to claim 16, wherein each of the cache lines is associated with any of storage areas in the memory in accordance with a low-order bits of an address in the memory.

18. The data processing method according to claim 1, wherein the acquiring includes acquiring the number of cache misses from hardware counter information that includes information on floating-point instructions executed at run time of a program.

19. The data processing method according to claim 1, wherein the acquiring includes acquiring the number of cache misses from hardware counter information that includes single instruction multiple data (SIMD) instruction information.

* * * * *